May 10, 1955 M. KRAMCSAK, JR 2,707,794
BRAKE-EQUIPPED CASTERS
Filed July 18, 1951 2 Sheets-Sheet 1

INVENTOR
Michael Kramcsak, Jr.
BY
Rockwell & Bartholow
ATTORNEYS

May 10, 1955  M. KRAMCSAK, JR  2,707,794
BRAKE-EQUIPPED CASTERS
Filed July 18, 1951  2 Sheets-Sheet 2
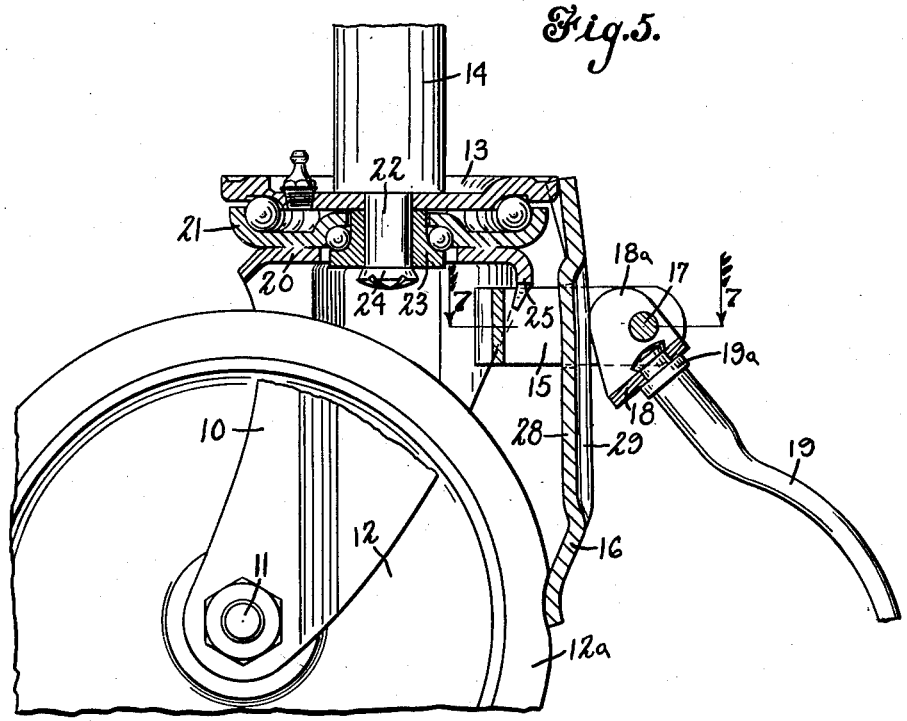
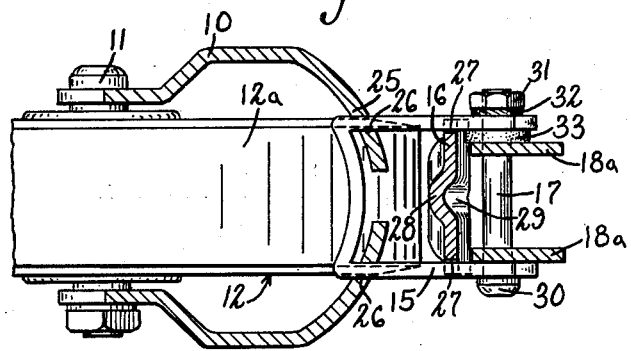
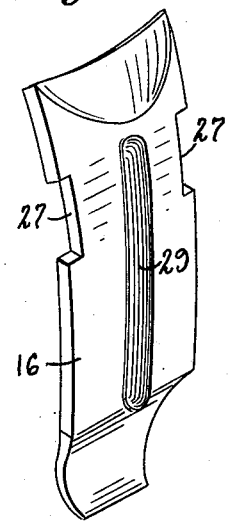
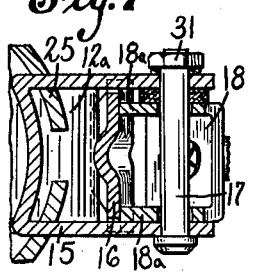
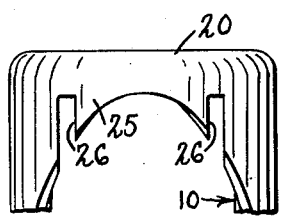
INVENTOR
Michael Kramcsak, Jr.
BY
Rockwell & Bartholow
ATTORNEYS

United States Patent Office 2,707,794
Patented May 10, 1955

2,707,794

BRAKE-EQUIPPED CASTERS

Michael Kramcsak, Jr., Bridgeport, Conn., assignor to The Bassick Company, Bridgeport, Conn., a corporation of Connecticut Application July 18, 1951, Serial No. 237,411

3 Claims. (Cl. 16—35)

This invention relates to brake-equipped casters, and more particularly to those of the general type disclosed in Patent No. 2,262,433 to Uecker et al., dated November 11, 1941. In such casters there is provided a braking element or shoe which has a dual function in that the upper extremity of the shoe engages the top plate of the caster to arrest swiveling movement, and the lower end portion of the shoe engages the caster wheel to prevent the rotation of the latter.

An object of the present invention is to provide an improved caster of this general type having certain important advantages.

Another object is to improve the structure and the operative characteristics of casters of this kind.

A further purpose of the invention is to provide improved operating mechanism for a movably mounted shoe employed in a caster for braking purposes.

Another aim is to provide an improved shiftable brake shoe for casters.

In the accompanying drawings:

Fig. 5 is a view similar to Fig. 4, showing the brake in the engaged position;

Fig. 6 is a section on line 6—6 of Fig. 1;

Fig. 7 is a section on line 7—7 of Fig. 5;

Fig. 8 is a fragmentary view showing a portion of the caster horn; and

Fig. 9 is a detail perspective view of the brake shoe.

Figure 1:
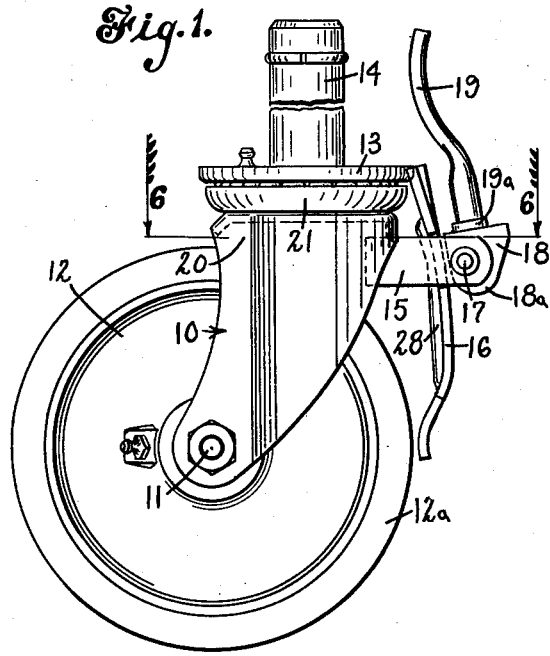
Fig. 1 is a side elevation of a caster embodying my improvements, the brake shoe being in the "off" position.
Figure 2:
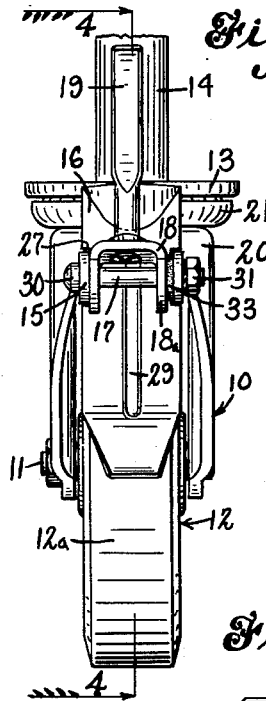
Fig. 2 is a rear elevation.

As above indicated, the invention is particularly applicable to casters of the general type shown in Patent 2,262,433, in which a brake shoe is adapted to be engaged at its upper end with a rotatable disk or top plate and at its lower end with the peripheral part of the caster wheel. A caster of this general type is illustrated in the drawings for purposes of description, although it is to be understood that in some aspects of the invention the improvements herein described are applicable to brake-equipped casters of other kinds. In the form shown in the drawings by way of example, the caster has a horn supporting at the lower part a wheel having a horizontal axis, and the caster has a top plate supported on anti-friction bearings interposed between the top plate and the horn top, the top plate being rotatable and rigidly fixed to an upstanding stem or pintle adapted for engagement in a socket provided in the object to be supported. The caster is also provided with a rearwardly extended support at the upper rear portion of the horn upon which is supported for movement in a generally forward and rearward direction a resilient brake shoe of which the upper end is adapted to engage and brake the above-mentioned top plate, the lower end of the shoe being engageable for braking purposes with the periphery of the caster wheel. The rearwardly projecting support above mentioned is provided with a transverse pivot pin on which is pivotally mounted a handle-equipped cam member having forwardly disposed camming legs that are adapted to be engaged with the rear surface of the shoe for the purpose of shifting the shoe forwardly into the braking position.

In the drawings, the horn of the caster is indicated at 10, the axle supported in the horn at 11, the wheel rotatable on the axle at 12, the top plate at 13, the stem or pintle rigid with the top plate, at 14, the rearwardly projecting support for the brake shoe at 15, the brake shoe at 16, the transverse pivot pin in the support 15, at 17, the cam pivoted on the pivot pin at 18, and the operating handle for the cam at 19.

The upper portion or top of the horn is indicated at 20, and at 21 is indicated a generally cup-shaped member which is rigidly fixed in a suitable manner to the horn top, as by welding, and serves the purpose of supporting from beneath the top plate 13 so that the latter can turn freely in a horizontal plane. In this form the stem or pintle 14 is provided at the lower end with a reduced portion 22 in the nature of a pin which projects through an annular member or collar 23 and is rigidly fixed to said member by staking the lower extremity of the portion 22, as indicated at 24. The lower surface of the main portion of pintle 14 rests on the top plate 13, and by the construction described the pintle is rigidly fastened to the annular member 23. Suitable anti-friction balls are interposed between the member 23 and the cup-shaped member 21, and suitable anti-friction balls are also interposed between the peripheral portion of the member 21 and the opposing portion of the top plate 13. The caster swivels easily by turning of the upper part of the horn structure relatively to the pintle and the top plate and the parts rigid therewith.

Figure 4:
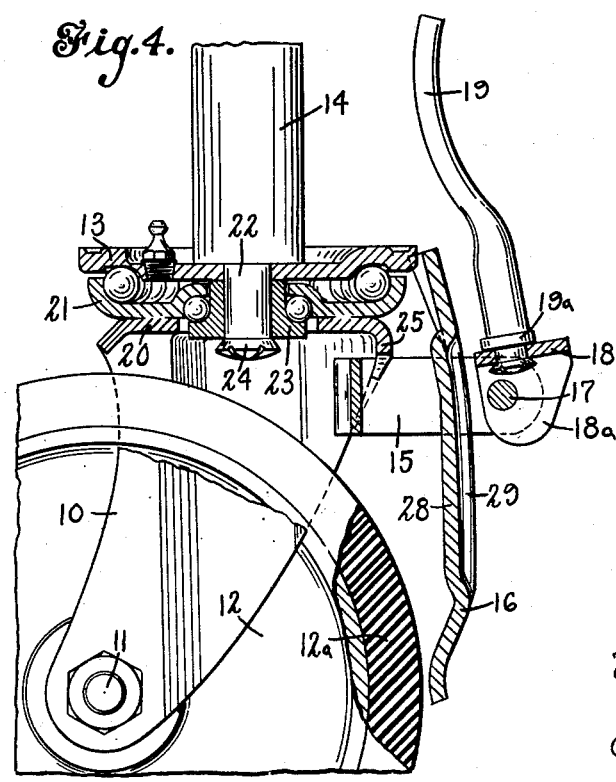
Fig. 4 is an enlarged section on line 4—4 of Fig. 2.
Figure 3:
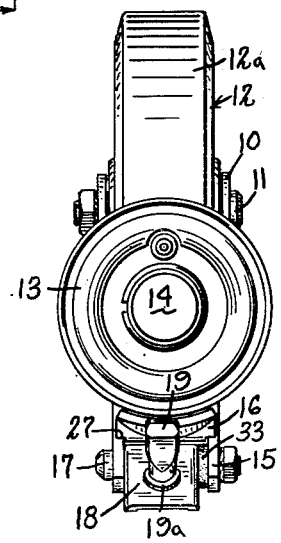
Fig. 3 is a top plan view.

The top 20 of the horn is integral with the legs, and at the rear the top is continued integrally in a downward direction to provide a skirt or flange 25, as shown in Figs. 4, 5 and 8. The rearwardly projecting member 15 is located partly within and partly without the flange 25, the main part of the member 15 being below the flange, and member 15 being arranged to extend forwardly as well as rearwardly of this flange. The member 15 may advantageously be in the form of a yoke or U-shaped member horizontally arranged and having the connecting part of the U forwardly of the flange 25, as shown in Fig. 6, while the open end of the U is spaced rearwardly a substantial extent from the flange 25, the pivot pin 17 extending through the legs of the U near the free ends of the legs. The U-shaped member 15 is suitably fixed to the horn in a rigid manner, and in this form the legs of the U are engaged in notches 26 provided in the flange 25, the connection being made rigid in a suitable manner as by welding the legs to the notched portion of the horn.

The brake shoe 16 is a springy sheet metal member of substantial thickness, suitably mounted on the side members or legs of the support 15 in such a manner that the shoe can have its extremities freely movable toward and away from the top plate and the caster wheel periphery, respectively. The caster wheel 12 will preferably have an elastic tire portion 12$^a$, of rubber composition or the like, with which the brake shoe can engage, and the upper extremity of the shoe is shaped to conform to the periphery of the top plate so that there may be close binding engagement between these parts. The above-mentioned movement of the shoe relatively to the supporting yoke can be provided for by furnishing the shoe with side notches 27 whereby the shoe may slide and also tilt to some extent with respect to the supporting yoke. The shoe in longitudinal section is slightly bowed, that is to say, it is curved on a relatively long radius, the convex portion being disposed toward the rear so that the action of the cam 18 will be upon its convex face. In order to strengthen the shoe and inhibit any tendency to its taking a permanent set under the action of the cam, the shoe is provided with a longitudinal rib at its forward or concave face, as indicated at 28, this rib being formed by displacement of the metal in a forward direction, thereby creating a corresponding groove 29 at the rear face of the shoe. This provides a relatively shallow and wide rounded projection at the forward face of the shoe, and at the rear of the shoe a narrower groove the side margins of which merge gradually into the rear face of the shoe, as shown in the drawings.

Where the width of the shoe plate is, say, two inches, the groove just referred to may have a width of say one quarter of an inch, and this leaves ample space on the rear face of the shoe at opposite sides of the groove for the engagement of the cam portions of the cam 18.

The cam 18, in the form shown, is constructed of a bar or strap of metal bent into U form so as to have the connecting part of the U disposed upwardly in the position of Fig. 1, the legs or side plates of this member being provided with perforations whereby they embrace the rigid pivot pin 17. The free extremities of the legs are formed as cams, and in the braking position shown in Fig. 5 the camming edges of the cam are engaged with the rear face of the shoe in a manner to hold the shoe in tight engagement with the respective co-acting parts. The handle 19 of the cam is fastened in any appropriate manner to the intermediate or connecting part of the cam, as by staking this part of the cam against a shoulder 19a on the handle. The free edge portions 18a on the legs or furcations of the fork-shaped cam are curved to produce the proper camming effect, and these portions are adapted to engage the rear face of the shoe in parts of the shoe that are generally in line horizontally with the supporting and guiding member 15 so as to move the shoe by a forward sliding and tipping action into the engaged position.

In the position of Fig. 1, which is the disengaged position, the handle 19 is approximately vertical, and the shoe is free of the top plate 13 and of the wheel tire 12a and also free of the cam 18. However, by effecting downward swing of the handle by pressure of the hand or of the foot, the curved edges 18a of the cam are brought into engagement with the rear face of the shoe, and as the handle is being moved to the position of Fig. 5 the shoe is moved forwardly to engage the caster parts, the shoe plate being bent somewhat to straighten it and exert very strong braking force against the top plate and the wheel tire.

Upon moving the cam out of the position of Fig. 5 back toward the position of Fig. 1, the shoe is released so as to disengage the caster parts, and in being released the shoe springs back to its original shape.

The pivot pin 17 preferably has a head 30 at one end and a clamping nut 31 engaging threads on the opposite end, and in connection with the nut 31 a lock washer 32 may be provided.

For the purpose of holding the cam very securely in any position in which it is set by means of its handle, suitable means are provided, and in the form shown this means is constituted by a washer 33 of leather or other suitable material embracing the pivot pin 17 and disposed at one side of the cam so as to have the effect of forcing the other side of the cam, in other word, its other leg, into tight contact with the opposing leg of the support 15. This provides a very effective means for holding the cam in the adjusted position. In this case the leather washer exerts thrust on the cam lengthwise of the pivot pin so as to frictionally engage the cam with its supporting member or frame.

Where the shoe plate is of bowed form and is provided along its median line with a reinforcing rib, as described, the shoe plate can be somewhat straightened by the action of a cam such as described above, so as to set the bowed shoe plate under compression against the co-acting parts of the caster whereby an especially strong braking action is produced, and yet, when the shoe plate is released, it will resume its initial shape, and it will not take a permanent set or be deformed so as to interfere with repeated brake engagement in service. No extraneous means is required for shifting the brake plate away from the caster parts upon release of the camming pressure.

In this form of the device, as shown in the drawings, the sides or legs of the horn are extended laterally rearwardly of the wheel axle so as to be farther apart, and are drawn inwardly at the rear adjacent the skirt 25. The legs of the support 15 have their inner faces spaced apart a distance about equal to the width of the wheel tread. At the lower end the shoe is beveled off somewhat at the sides, so that in the portion which makes contact with the wheel tread its width is somewhat reduced, and this lower end or tip portion of the shoe is preferably bowed in a reverse direction to a slight extent, that is to say, its bowing is the reverse of that of the remaining portion of the shoe. It will be noted that the bowing of the shoe is continued all the way to the upper extremity in this form, but that the cross-sectional shape of the shoe is changed toward the upper extremity from a planar section to a curved section, the curve being adapted to conform to the curve of the top plate. It is further to be noted that in this form the notches by which the shoe is engaged with the shoe support are somewhat above a point which is equidistant from the ends of the shoe. By this arrangement, tipping of the shoe relatively to its support carries the lower end of the shoe through a greater distance than is the case with the upper end of the shoe.

It will be noted that the shoe plate presents a bow extending substantially from the region of contact of the plate with the wheel to the region of contact with the top plate of the caster. The longitudinal reinforcing rib is of substantial length but does not extend to the respective tip portions of the shoe. The portions of the shoe which are at the respective sides of the rib are preferably of flat or planar cross section, as shown in the dawings.

In the form shown, the brake shoe portion within the support 15 is in a free space and capable of some movement forwardly and rearwardly, as well as tipping or tilting movement, and it is also capable of turning to some extent on an upright axis. Rearward movement of the shoe in the position of Fig. 1 will be limited by engagement of the shoe with the connecting portion of the bifurcated cam. There is no physical connection between the brake shoe and the cam, and the forcing of the brake shoe to operating position is effected by the impingement of the camming portions, whereas release of the brake is effected by disengagement of these portions from the shoe and by the spring action of the shoe, as above described, which shoe, upon release, springs away from the co-acting parts of the caster and is therefore self-releasing.

The improved structure is comparatively simple and may be manufactured at relatively low cost, and the device operates very satisfactorily in service, being adapted by convenient manipulation to exert very strong and effective braking pressure and preserve or continue the braking pressure as long as is desired. It is important that the brake shoe be of a character such that it will not take a permanent set as the result of the application of the brake. If this takes place, the shoe is deformed so that it is no longer usable. In the present case, the bow of the brake shoe which extends from the point of contact with the plate to the point of contact with the wheel, represents only a slight bowing or dishing, in other words, one on a large radius, but the structure is one in which no permanent set is impressed upon the shoe, and on release the shoe will always return to the original shape, thereby providing for a long lasting and safe use of the caster in service. There is no deformation of the shoe as the result of use, and while, as above mentioned, the bowing of the shoe is slight, it is ample for providing self-release of the shoe which,

What I claim is:

1. In a caster, a top plate, a horn swivelly mounted under the top plate and having a caster wheel supported therein, a support projecting rearwardly from the upper part of the horn, a brake shoe mounted for movement in said support toward and away from the wheel periphery and having its extremities respectively engageable with the periphery of the top plate and the periphery of the wheel, said shoe being made of resilient material and elongated in a generally vertical direction and bowed with a shallow bow so that its surface remote from the wheel is generally convex and having a median longitudinal rib extending through a considerable part of its length, the bow of the shoe extending substantially from the point where the shoe engages the top plate to the point where it engages the wheel, and a turnable cam mounted in said support for engaging the convex surface of the shoe on opposite sides of said rib to engage the shoe and flatten the bow of the shoe when and as the shoe is moved to the engaged position, said shoe by reason of its nature and structure as aforesaid effectively resisting a permanent set of the shoe when so flattened or deformed, said shoe being free from the cam and movable to the engaged position by impingement thereagainst of the cam and being self-releasing by spring action inherent in the shoe when disengaged by the cam.

2. In a caster, a top plate, a horn mounted for swiveling movement under the top plate and having a caster wheel mounted therein, a support projecting rearwardly and substantially horizontally from the upper part of the horn, a brake shoe of resilient bar material having sliding and tilting engagement with said support and directed approximately vertically and having an upper extremity to conform to and engage the periphery of the top plate and a lower extremity to conform to and frictionally engage the periphery of the caster wheel so as to brake said wheel, said shoe being bowed to a slight extent substantially from the point where it engages the top plate to the point where it engages the wheel and having its convexity at the rear, said shoe being provided through a substantial portion of its length with a longitudinal median indentation at the rear face creating a longitudinal reinforcing rib, said shoe being slidably and tiltingly supported from said support in a location which is somewhat closer to the upper end of the shoe than to the lower end, and a fork-shaped turnable cam member located in said support rearwardly of said shoe having furcations of cam formation adapted to engage the rear face of said shoe at opposite sides of said reinforcing rib and to flatten the shoe as the extremities of the shoe are forced into engagement with the top plate and the wheel periphery respectively, said shoe by reason of its aforesaid nature and structure effectively resisting a permanent set when so deformed, said cam being free of connection to said shoe and said shoe being self-retracting when and as the cam member is moved from the engaged position toward the releasing position.

3. In a caster, a fixed top plate, a legged horn mounted under the top plate in swiveling relation thereto and carrying a caster wheel, the rear portion of the horn at the upper part thereof having an integral depending skirt which is highest at the middle part and is continued integrally to provide downwardly extending rear edges of the horn legs, said skirt being provided adjacent its upper middle part with a pair of notches entering the skirt at the lower edge and extending upwardly from the lower edge, a brake support generally in the form of a U horizontally arranged with the connecting part of the U disposed forwardly under the top of the horn and bent so as to be substantially concentric with said skirt, side portions of said support adjacent said connecting portion being located in said notches and secured in said notches and the sides of said U-shaped support having free ends disposed rearwardly of the caster, a bifurcated cam movable in a vertical plane to pivot between the extended rear portions of the brake support, said cam having an operating handle secured thereto, and a brake shoe mounted upon said brake support forwardly of said cam and operable by said cam to engage said caster wheel and said top plate for braking the caster against wheel rotation and swiveling movement.

References Cited in the file of this patent

UNITED STATES PATENTS

| Number | Name | Date |
|---|---|---|
| 743,995 | Truffault | Nov. 10, 1903 |
| 1,546,584 | Hutt | July 21, 1925 |
| 1,602,631 | White | Oct. 12, 1926 |
| 1,687,631 | Oberwegner | Oct. 16, 1928 |
| 2,044,453 | Troendly | June 16, 1936 |
| 2,070,005 | Dom et al. | Feb. 9, 1937 |
| 2,180,994 | Mulcahy | Nov. 21, 1939 |
| 2,202,301 | Probst | May 28, 1940 |
| 2,262,433 | Uecker et al. | Nov. 11, 1941 |
| 2,484,094 | Jackson | Oct. 11, 1949 |
| 2,572,548 | Weisz et al. | Oct. 23, 1951 |